(12) United States Patent
Feng et al.

(10) Patent No.: US 11,347,029 B2
(45) Date of Patent: May 31, 2022

(54) CAMERA LENS (71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 40 days.

(21) Appl. No.: 17/118,943

(22) Filed: Dec. 11, 2020

(65) Prior Publication Data

US 2021/0231919 A1 Jul. 29, 2021

(30) Foreign Application Priority Data

Jan. 21, 2020 (CN) .......................... 202010069603.2

(51) Int. Cl.
*G02B 13/00* (2006.01)
*G02B 9/14* (2006.01)
*G02B 27/00* (2006.01)

(52) U.S. Cl.
CPC ........... *G02B 13/0035* (2013.01); *G02B 9/14* (2013.01); *G02B 27/0025* (2013.01)

(58) Field of Classification Search
CPC ........ G02B 9/14; G02B 9/16; G02B 13/0035; G02B 27/0025
See application file for complete search history.

*Primary Examiner* — Jack Dinh
(74) *Attorney, Agent, or Firm* — ScienBiziP, P.C.

(57) ABSTRACT

A camera lens or lens group of reduced overall length includes a first lens with positive power, a second lens with negative power, a third lens with positive power, and an imaging element. The first, object side, lens includes a first surface and a second surface, the second lens includes a third surface and a fourth surface, and the third lens includes a fifth surface and a sixth surface. The camera lens satisfies conditions of 1.00<D/TTL<1.25; 0.85<|F1|/|F|<0.95; 3.85<|F2|/|F|<4.15; and 21.50<|F3|/|F|<27.50. D is the maximum imaging circle diameter on the imaging surface, TTL is the distance from the center point to the imaging side of the object-side surface of the first lens, F is the total focal length of the camera lens, F1 is the focal length of the first lens, F2 is the focal length of the second lens, and F3 is the focal length of the third lens.

18 Claims, 8 Drawing Sheets

CAMERA LENS

FIELD

The subject matter herein generally relates to imaging, and a camera lens.

BACKGROUND

Image system continues to develop towards multi-functions, such as mobile phone image communication, smart home monitoring system, car image system. The traditional camera lens is relatively large and long, which is not conducive to the miniaturization of application equipment. In order to save space, most camera lenses use three-element lens design, but the total length is still long.

Therefore, improvement is desired.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

It should be noted that, expressions such as first, second, third are only used to distinguish one feature from another feature, and do not represent any restriction on the feature. Therefore, without departing from the teachings of the present application, the first lens discussed below may also comprehend a second lens or a third lens.

In the drawings, the thickness, size, and shape of the lens have been slightly exaggerated for ease of description, but it should be understood that the size of each component is not limited by the drawings, but can be adjusted within a certain range. Specifically, the shape of a spherical or aspherical surface shown in the drawings is shown by way of example. That is, the shape of the spherical surface or the aspheric surface is not limited to the shape of the spherical surface or the aspheric surface shown in the drawings. The drawings are only examples and are not drawn strictly to scale.

In addition, the paraxial area refers to an area near the optical axis. The first lens is the lens closest to the object and the third lens is the lens closest to a photosensitive element. It should be noted that the surface closest to the object in each lens is called the object side, and the surface closest to the imaging surface in each lens is called the imaging side.

Figure 1:
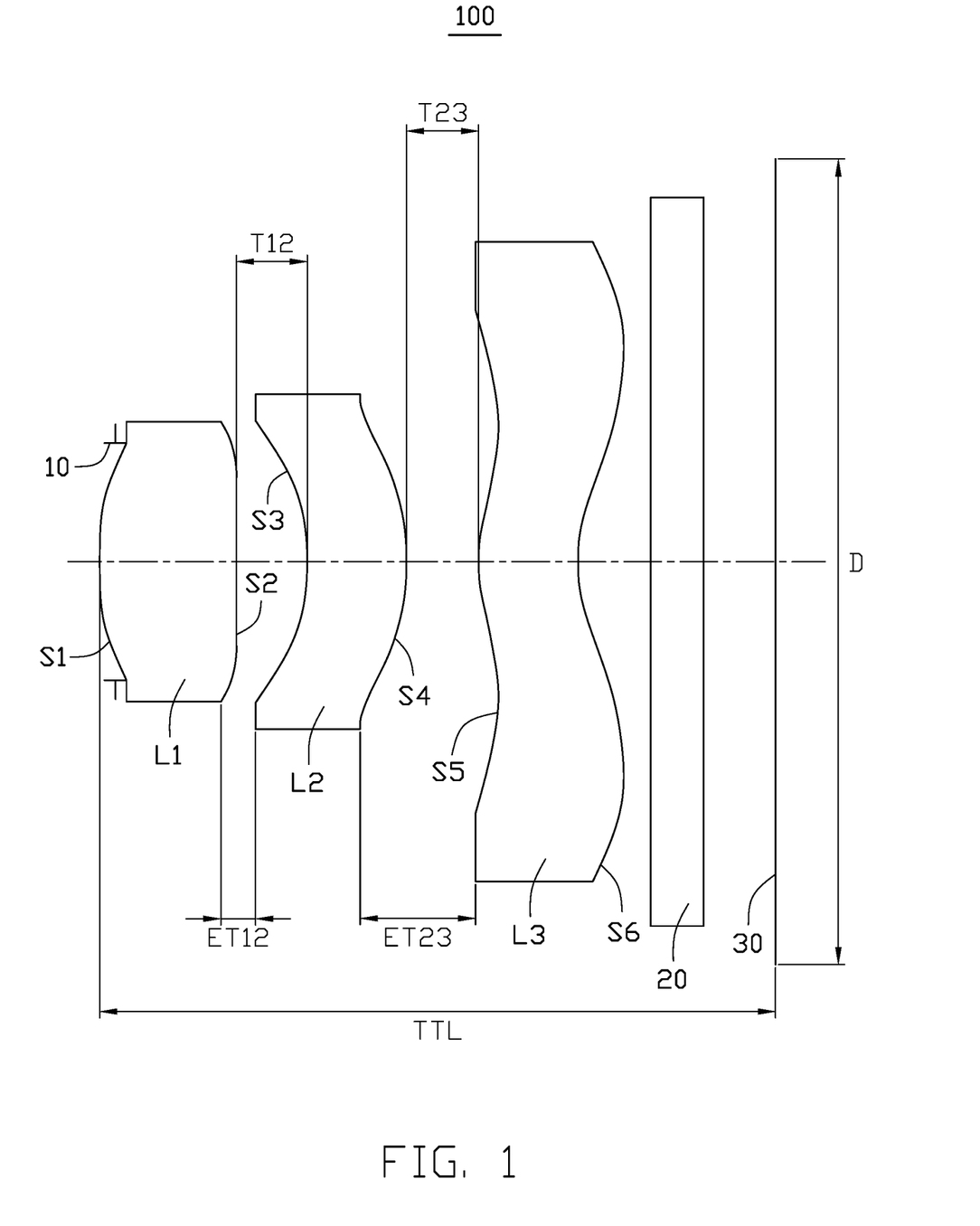
FIG. 1 is a schematic diagram of a first embodiment of a camera lens of the present disclosure.

FIG. 1 illustrates a camera lens 100 in accordance with an embodiment of the present disclosure.

The camera lens 100 can be used for cameras of mobile phones, notebook computers, desktop computers, game consoles, LCD TVs, or any products that require image-capturing.

The camera lens 100 includes, from object side to imaging side, a first lens with positive power, a second lens with negative power, a third lens with positive power, and an imaging surface.

The three lenses are made of plastic material or PMMA material, and cost is low. The light transmittance of PMMA is good, and the temperature resistance of plastic materials is good. Plastic materials or PMMA materials can be selected according to the actual practical environment. The scope of application is wider and it can be used flexibly. The imaging effect of glass material is better.

The second lens is made of glass material, which makes the imaging effect of the lens better, and combined with the first lens and the third lens made of plastic or PMMA material, its cost is lower and it is more suitable for use.

The first lens L1 has positive power, the second lens L2 has negative power, and the third lens L3 has positive power. Therefore, through the reasonable combination of positive and negative optical power, system avoids excessive concentration of the optical power, and can effectively correct the aberration in the entire optical system, and suffer only small distortion of the optical lens. It is not only conducive to the improvement of the resolution in the high-frequency space, but also conducive to shortening the overall length of the lens, realizing the requirement of miniaturization, and striking a better balance between aberrations and size of the entire system.

The first lens L1 includes a first surface S1 and a second surface S2 in sequence from the object side to the imaging side, and the second lens L2 includes a third surface S3 and a fourth surface S4 in sequence from the object side to the imaging side. The third lens L3 includes a fifth surface S5 and a sixth surface S6 in order from the object side to the imaging side. The first surface S1, the second surface S2, the third surface S3, the fourth surface S4, the fifth surface S5, and the sixth surface S6 are all aspherical.

The surfaces of the first lens L1 to the third lens L3 that are convex or concave to the object side or convex or concave to the imaging side can be determined by the sign of the radius of curvature in Table 1 or Table 5. If a surface is regular and odd-numbered, it is convex relative to the object side; if a surface is regular and even-numbered, it is concave relative to the imaging surface. If an odd-numbered surface has negative sign, it is concave relative to the object side; if an even-numbered surface has negative sign, it is convex relative to the imaging surface.

Specifically, the first lens L1 includes a first surface S1 protruding toward the object side and a second surface S2 protruding toward the imaging surface 30 in order from the object side to the imaging side.

The second lens L2 includes, from the object side to the imaging side, a third surface S3 that is concave and groove-shaped relative to the object side and a fourth surface S4 that is convex relative to the imaging surface.

The third lens L3 includes, from the object side to the imaging side, a fifth surface S5 that is convex relative to the object side and a sixth surface S6 that is concave and groove-shaped relative to the imaging surface.

In one embodiment, the camera lens 100 further includes a diaphragm 10. The diaphragm 10 is located on the object side of the first lens L1. The overall structure of the camera lens 100 is symmetrical with respect to the diaphragm 10, the diaphragm 10 reduces the influence of coma. The diaphragm 10 can limit the luminous flux of the light passing into the third lens L3, and make the light cone after passing through the third lens L3 more symmetrical, and the coma of the camera lens 100 can be corrected.

In one embodiment, the camera lens 100 further includes a filter element 20. The filter element 20 can be used to correct color deviation. The filter element 20 is located between the third lens and the imaging surface.

In the embodiment, light is incident on the first lens L1, the second lens L2, the third lens L3, and the filter 20 from the diaphragm 10, and then forms an image on the imaging surface 30. It is should be noted that, an image sensor (not shown), such as a charge coupled device (CCD) or a complementary metal oxide semiconductor (CMOS), can be disposed on the imaging surface 30 to form an imaging system.

The camera lens 100 satisfies the conditions of formula (formula (1)):

$$1.00 < D/\mathrm{TTL} < 1.25. \quad (1)$$

D is the maximum imaging circle diameter of the imaging surface 30. TTL is the length of the camera lens 100, that is, the axial distance from the center point of the object side surface of the first lens L1 to the imaging surface 30.

The formula (1) limits the range of ratios between a maximum imaging circle diameter of the camera lens 100 and a total length, to render the overall size of the camera lens 100 as short as possible.

The camera lens 100 further satisfies the conditions of formulas (respectively (formula (2)), (formula (3)), and (formula (4)):

$$0.85 < |F1|/|F| < 0.95. \quad (2)$$

$$3.85 < |F2|/|F| < 4.15. \quad (3)$$

$$21.50 < |F3|/|F| < 27.50. \quad (4)$$

F is the total focal length of the camera lens 100, F1 is the focal length of the first lens L1, F2 is the focal length of the second lens L2, and F3 is the focal length of the third lens L3.

Formula (2) defines the positive power of the first lens L1.

Formula (3) defines the negative power of the second lens L2.

Formula (4) defines the positive power of the third lens L3.

The camera lens 100 satisfies formulas (2)-(4), it can meet the lens design requirements of reduced length, and can also ensure proper power distribution of the camera lens 100, and correction of aberrations to improve imaging quality, thereby reducing the eccentric sensitivity of the camera lens 100.

The camera lens 100 further satisfies the conditions of formulas (respectively (formula (5)) and (formula (6)):

$$5.50 < SF2 < 6.5. \quad (5)$$

$$10.50 < SF3 < 11.50. \quad (6)$$

$$SFi = (C1i + C2i)/(C1i - C2i), i = 2, 3.$$

C1$i$ is the radius of curvature of the surface of the i-th lens on the object side, C2$i$ is the radius of curvature of the surface of the i-th lens on the imaging side.

In formulas (5) and (6), by constraining the radii of curvature of the object side and imaging side of the second lens L2 and the third lens L3, the shapes of the second lens L2 and the third lens L3 are accordingly defined, and effectively balances astigmatism and coma of the second lens L2 and the third lens L3, the camera lens 100 having a good aberration correction. Therefore, it is possible to avoid the occurrence of poor molding and stress in manufacturing because of excessive surface curvature of the second lens L2 or the third lens L3.

The camera lens 100 further satisfies the conditions of formula (formula (7)):

$$1.00 < N2/N3 < 1.15. \quad (7)$$

N2 is the refractive index of the second lens L2. N3 is the refractive index of the third lens L3.

Within this range, the overall length of the camera lens 100 can be reduced, the eccentric sensitivity of the camera lens 100 can be reduced, and spherical aberration and distortion can be corrected.

The camera lens 100 further satisfies the conditions of formula (formula (8)):

$$0.30 < V2/V3 < 0.40. \quad (8)$$

V2 is the Abbe number of the second lens L2, V3 is the Abbe number of the third lens L3.

Within this range, reduction of the overall length of the camera lens 100 and correction of aberrations can be achieved.

The camera lens 100 further satisfies the conditions of formulas (respectively (formula (9)) and (formula (10)):

$$1.55 < T12/ET12 < 1.75. \quad (9)$$

$$0.55 < T23/ET23 < 0.75. \quad (10)$$

T12 is the thickness of the center interval between the first lens L1 and the second lens L2, and ET12 is the thickness of the edge interval between the first lens L1 and the second lens L2.

T23 is the thickness of the center interval between the second lens L2 and the third lens L3, and ET23 is the thickness of the edge interval between the second lens L2 and the third lens L3.

Therefore, the ratio of thickness of the center interval between the first lens L1 and the second lens L2 and the thickness of the edge interval of the first lens L1 and the second lens L2 is controlled, and the ratio of the thickness of the center interval between the second lens L2 and the third lens L3 to the thickness of the edge interval between the second lens L2 and the third lens L3 is controlled. It can effectively reduce the risk of ghosting caused by the camera lens 100, so that the camera lens 100 has a better ability to balance aberrations. Formulas (9) and (10) provide a camera lens 100 with good aberration correction.

The first surface S1, the second surface S2, the third surface S3, the fourth surface S4, the fifth surface S5, and the sixth surface S6 satisfy this aspheric surface type formula (formula (AS)):

$$Z = \frac{cr^2}{1 + \sqrt{1 - (1 + K)c^2 r^2}} + A_4 h^4 +$$

-continued $$A_6 h^6 + A_8 h^8 + A_{10} h^{10} + A_{12} h^{12} + A_{14} h^{14} + A_{16} h^{16}.$$

Z is the displacement value from the optical axis along the optical axis at the height of h with the surface vertex as a reference, c is the radius of curvature, and h is the lens height. K is the cone constant, $A_4$ is the fourth-order aspherical coefficient, $A_6$ is the sixth-order aspherical coefficient, and $A_8$ is the $8^{th}$-order aspherical coefficient. $A_{10}$ is the $10^{th}$-order aspheric coefficient, $A_{12}$ is the $12^{th}$ order aspheric coefficient, $A_{14}$ is the $14^{th}$-order aspheric coefficient, and $A_{16}$ is the $16^{th}$-order aspheric coefficient.

By substituting the data in Tables 1-4 (see below) into the above formulas, the aspherical shape of each lens surface in the camera lens 100 according to the first embodiment of the present disclosure can be obtained.

By substituting the data in Tables 5-8 (see below) into the above formulas, the aspherical shape of each lens surface in the camera lens 100 according to the second embodiment of the present disclosure can be obtained.

First Embodiment

The optical components of the camera lens 100 provided by the first embodiment of the present disclosure satisfy the conditions in Table 1 to Table 4. F# in Table 3 and Table 6 refers to the aperture value of the camera lens 100.

TABLE 1

| Surface | Type | Radius of curvature (mm) | Thickness (mm) | Refractive index | Abbe number |
|---|---|---|---|---|---|
| Object | Plane | Infinity | Infinity | — | — |
| Diaphragm | Plane | Infinity | −0.05 | — | — |
| S1 | Aspherical | 1.76 | 0.29 | 1.54 | 56.00 |
| S2 | Aspherical | −0.07 | 0.14 | — | — |
| S3 | Aspherical | −1.85 | 0.20 | 1.66 | 20.40 |
| S4 | Aspherical | −1.32 | 0.15 | — | — |
| S5 | Aspherical | 2.67 | 0.20 | 1.54 | 56.00 |
| S6 | Aspherical | 3.23 | 0.15 | — | — |
| Filter element | Plane | Infinity | 0.11 | 1.56 | 51.30 |
| Air | Plane | Infinity | 0.15 | — | — |
| Image | Plane | Infinity | — | — | — |

TABLE 2

| Aspherical coefficient | S1 | S2 | S3 | S4 | S5 | S6 |
|---|---|---|---|---|---|---|
| K | −1.3681E+00 | 0.0000E+00 | 1.7777E+00 | −1.0365E−01 | −4.1501E+00 | −3.3240E+00 |
| A4 | 6.1560E−01 | −4.1830E+00 | −6.1755E+00 | −1.2438E+01 | −1.0238E+01 | −5.8456E+00 |
| A6 | −3.9335E+01 | 8.1425E+01 | 1.1502E+02 | 2.5628E+02 | 5.9547E+01 | 3.3833E+01 |
| A8 | 2.2867E+03 | −4.2807E+03 | −3.7124E+03 | −4.1563E+03 | −2.2505E+02 | −1.4062E+02 |
| A10 | −8.0880E+04 | 1.0082E+05 | 8.2642E+04 | 4.7648E+04 | 6.9437E+02 | 3.8519E+02 |
| A12 | 1.5357E+06 | −1.3474E+06 | −6.3373E+05 | −3.0015E+05 | −1.6701E+03 | −6.5572E+02 |
| A14 | −1.5281E+07 | 9.6059E+06 | 4.5892E+05 | 1.0648E+06 | 2.5592E+03 | 6.1355E+02 |
| A16 | 6.1799E+07 | −2.8596E+07 | 1.0798E+07 | −1.8304E+06 | −1.7479E+03 | −2.3594E+02 |

TABLE 3

| F/# | FOV(2ω) | TTL(mm) | D(mm) | F(mm) |
|---|---|---|---|---|
| 2.17 | 74.70 | 1.38 | 1.64 | 1.08 |

TABLE 4

| F1(mm) | F2(mm) | F3(mm) | N2 | V2 | N3 | V3 |
|---|---|---|---|---|---|---|
| 1.00 | −4.40 | 28.64 | 1.66 | 20.40 | 1.54 | 56.00 |
| SF2 | SF3 | T12(mm) | ET12(mm) | T23(mm) | ET23(mm) | |
| 5.91 | −10.64 | 0.14 | 0.08 | 0.15 | 0.23 | |

FIG. 1 is a schematic diagram of the first embodiment of the camera lens 100. In the embodiment, the field of view of the camera lens 100 is 74.70°, and the focal length of the camera lens 100 is 1.08 mm. The field curvature and distortion of the camera lens 100 are shown in FIGS. 2 and 3 respectively.

Figure 2:
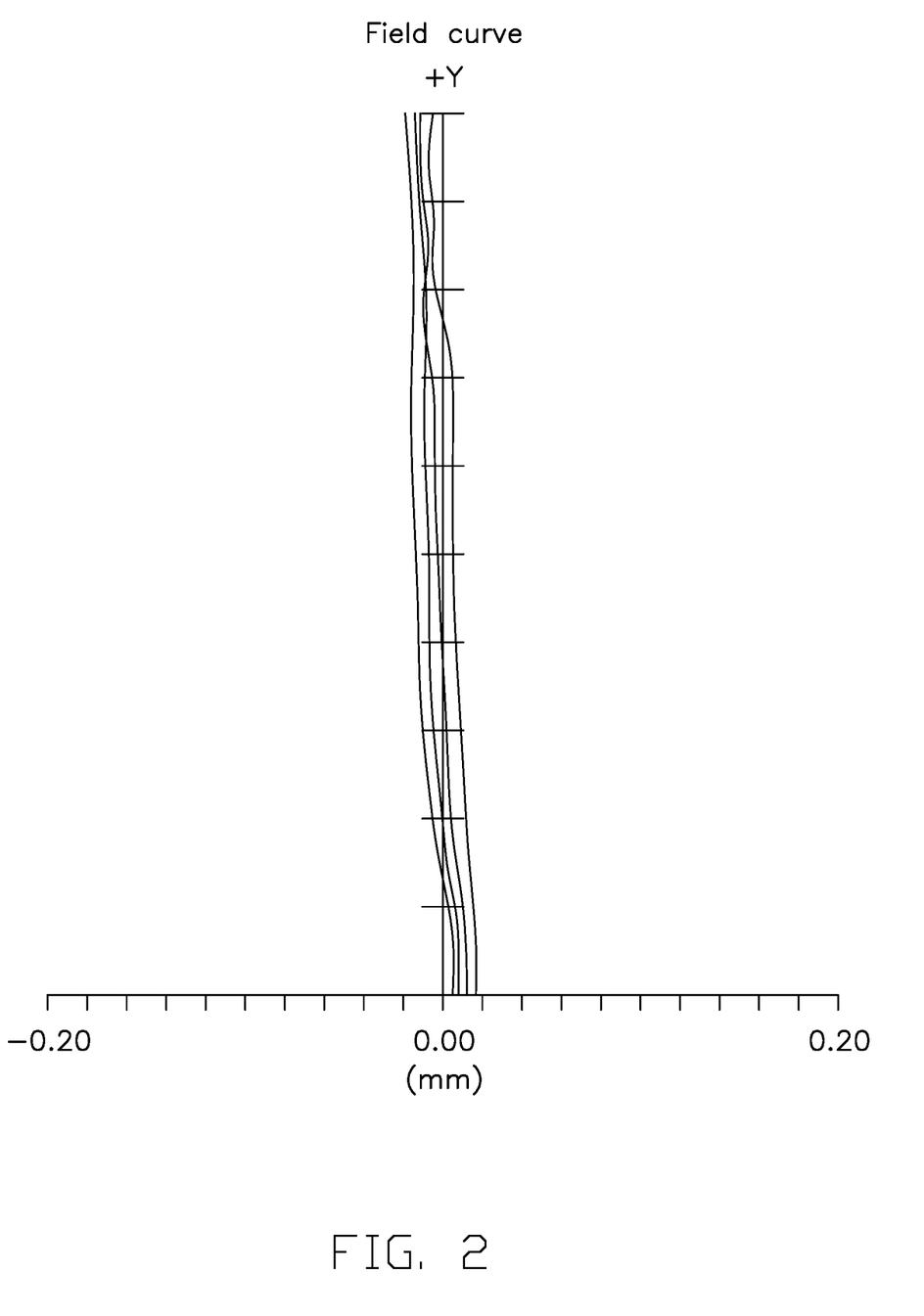
FIG. 2 is curve of field curve diagram of the first embodiment of the camera lens.

As shown in FIG. 2, curves T and S are the characteristic curves of tangential field curvature and sagittal field curvature, respectively. It can be seen from FIG. 2 that the meridian field curvature and sagittal field curvature of the camera lens 100 are controlled within the range of −0.20 mm~0.20 mm.

Figure 3:
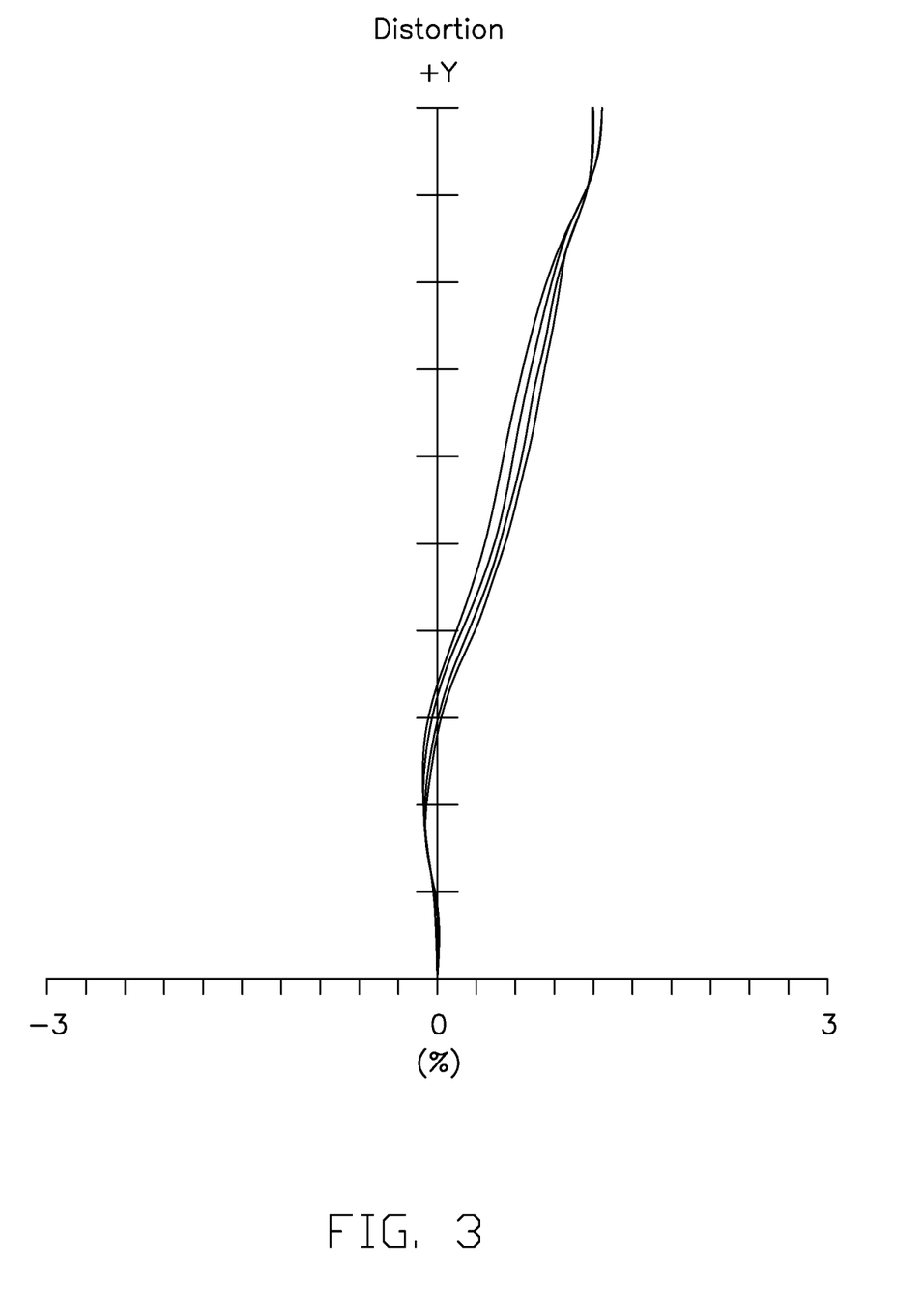
FIG. 3 is distortion characteristic curve diagram of the first embodiment of the camera lens.

Furthermore, the curve shown in FIG. 3 is the distortion characteristic curve of the camera lens 100. It can be seen from FIG. 3 that the optical distortion amount of the camera lens 100 is controlled within the range of −3.00% to 3.00%.

Figure 4:
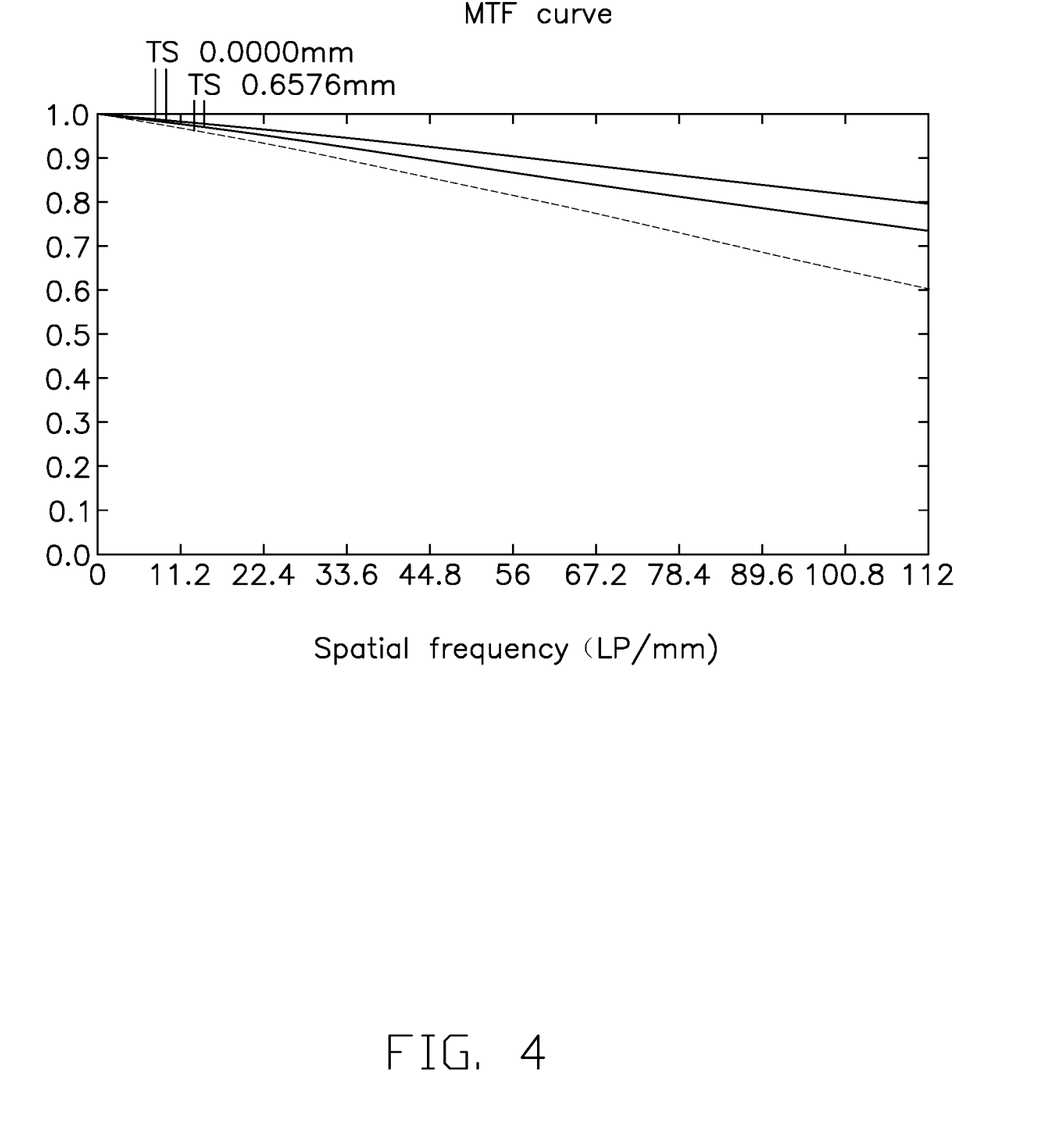
FIG. 4 is modulation transfer function characteristic curve diagram of the first embodiment of the camera lens.

FIG. 4 is a Modulation Transfer Function (MTF) diagram of the camera lens 100. MTF represents lens resolution. The unit of MTF frequency is line pair/mm, which means the number of resolvable line pairs per millimeter (mm).

Under the condition of ¼ frequency (Nyquist frequency), the ¼ frequency of this embodiment is 112 l p/mm, the MTF of the center field of view is >75%, as shown by the curve mc.

MTF of 0.8 field of view >55%, as shown by curve mp, and the MTF of the field of view between the central field of view and 0.8 field of view is between 55% and 75%.

In summary, the total length (TTL) of the camera lens 100 is only 1.38 mm, the camera lens meeting the conditions of formulas (1)-(4) has the characteristics of low overall length and higher resolution.

Second Embodiment

The optical components of the camera lens 100 provided by the second embodiment of the present disclosure satisfy the conditions in Table 5 to Table 8.

TABLE 5

| Surface | Type | Radius of curvature (mm) | Thickness (mm) | Refractive index | Abbe number |
|---|---|---|---|---|---|
| Object | Plane | Infinity | Infinity | — | — |
| Diaphragm | Plane | Infinity | −0.05 | — | — |
| S1 | Aspherical | 1.78 | 0.27 | 1.54 | 56.00 |
| S2 | Aspherical | −0.06 | 0.15 | — | — |
| S3 | Aspherical | −1.85 | 0.20 | 1.66 | 20.40 |
| S4 | Aspherical | −1.30 | 0.16 | — | — |
| S5 | Aspherical | 2.62 | 0.21 | 1.54 | 56.00 |
| S6 | Aspherical | 3.15 | 0.14 | — | — |
| Filter element | Plane | Infinity | 0.11 | 1.56 | 51.30 |
| Air | Plane | Infinity | 0.15 | — | — |
| Image | Plane | Infinity | — | — | — |

TABLE 6

| Aspherical coefficient | S1 | S2 | S3 | S4 | S5 | S6 |
|---|---|---|---|---|---|---|
| K | −1.4284E+00 | 0.0000E+00 | 1.7907E+00 | −3.1255E−01 | −4.0261E+00 | −3.3896E+00 |
| A4 | 5.7537E−01 | −4.2546E+00 | −6.1833E+00 | −1.2354E+01 | −1.0083E+01 | −5.7771E+00 |
| A6 | −4.0408E+01 | 8.1052E+01 | 1.1485E+02 | 2.5649E+02 | 5.9803E+01 | 3.3868E+01 |
| A8 | 2.2825E+03 | −4.2919E+03 | −3.7089E+03 | −4.1564E+03 | −2.2507E+02 | −1.4062E+02 |
| A10 | −8.0929E+04 | 1.0055E+05 | 8.2786E+04 | 4.7646E+04 | 6.9274E+02 | 3.8538E+02 |
| A12 | 1.5341E+06 | −1.3516E+06 | −6.3076E+05 | −3.0011E+05 | −1.6765E+03 | −6.5512E+02 |
| A14 | −1.5301E+07 | 9.5961E+06 | 4.9415E+05 | 1.0661E+06 | 2.5503E+03 | 6.1404E+02 |
| A16 | 6.1508E+07 | −2.7288E+07 | 1.0710E+07 | −1.8103E+06 | −1.6641E+03 | −2.3914E+02 |

TABLE 7

| F/# | FOV(2ω) | TTL(mm) | D(mm) | F(mm) |
|---|---|---|---|---|
| 2.18 | 74.90 | 1.38 | 1.64 | 1.08 |

TABLE 8

| F1(mm) | F2(mm) | F3(mm) | N2 | V2 | N3 | V3 |
|---|---|---|---|---|---|---|
| 1.00 | −4.22 | 24.66 | 1.66 | 20.40 | 1.54 | 56.00 |
| SF2 | SF3 | T12(mm) | ET12(mm) | T23(mm) | ET23(mm) | |
| 5.76 | −10.92 | 0.15 | 0.10 | 0.16 | 0.25 | |

Figure 5:
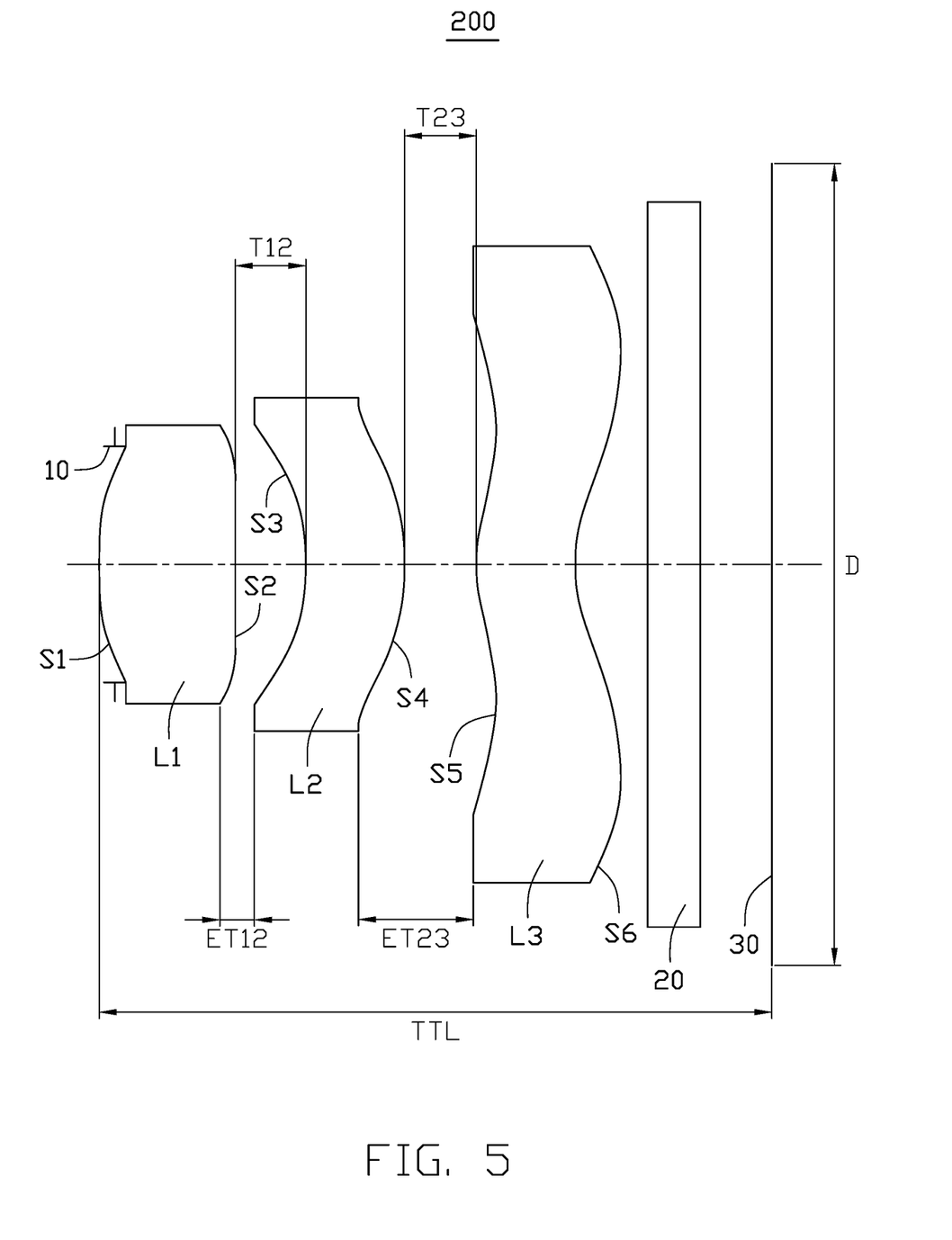
FIG. 5 is a schematic diagram of a second embodiment of a camera lens.

FIG. 5 is a schematic diagram of the second embodiment of the camera lens 100. In the embodiment, the field of view (FOV) of the camera lens 100 is 74.90°, and the focal length of the camera lens 100 is 1.08 mm. The field curvature and distortion of the second embodiment of the camera lens 100 are shown in FIGS. 6 and 7 respectively.

Figure 6:
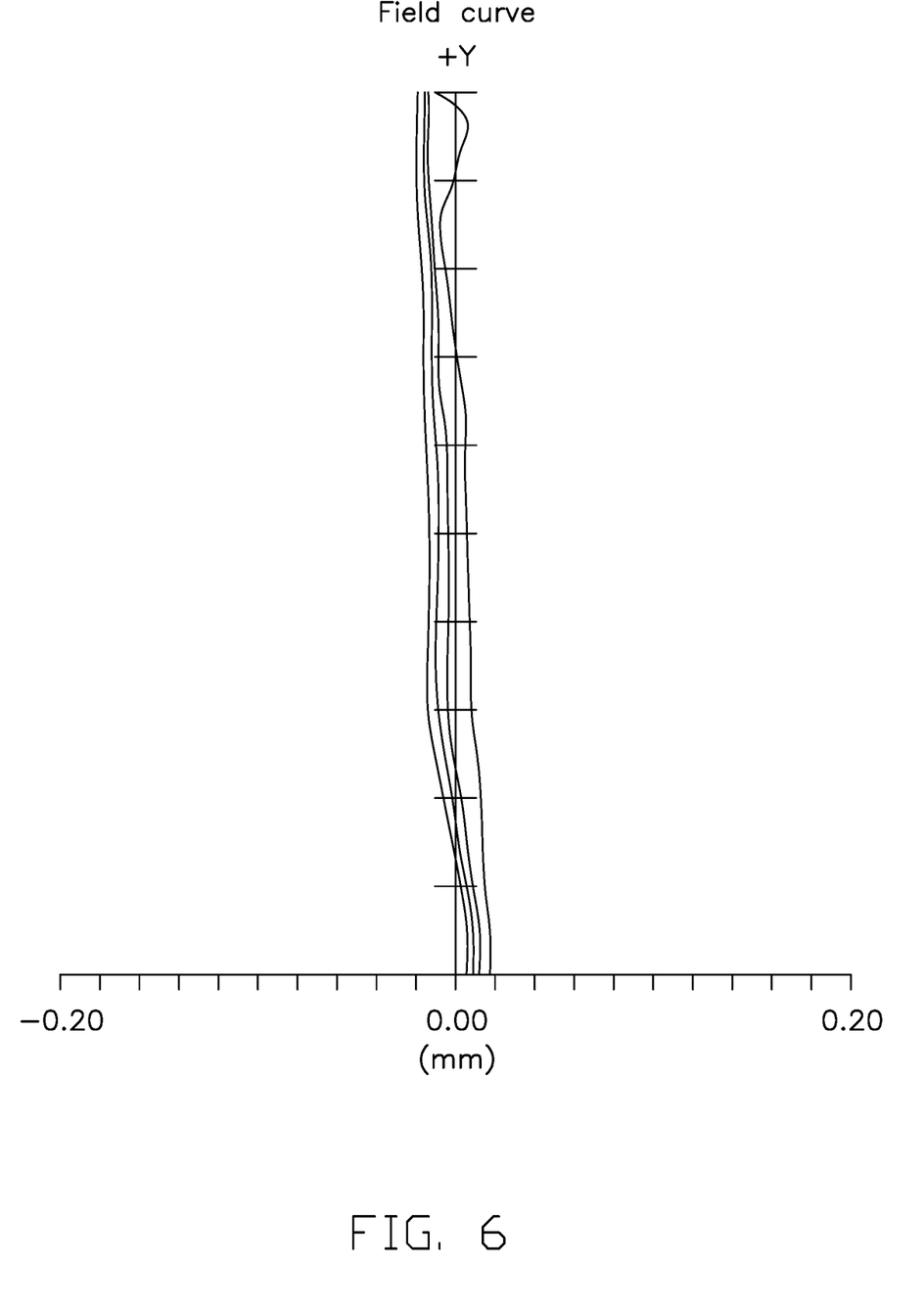
FIG. 6 is curve of field curve diagram of the second embodiment of the camera lens.

As shown in FIG. 6, curves T and S are the characteristic curves of tangential field and sagittal field respectively. It can be seen from FIG. 6 that the meridian field curvature and sagittal field curvature of the camera lens 100 are controlled within the range of −0.20 mm~0.20 mm.

Figure 7:
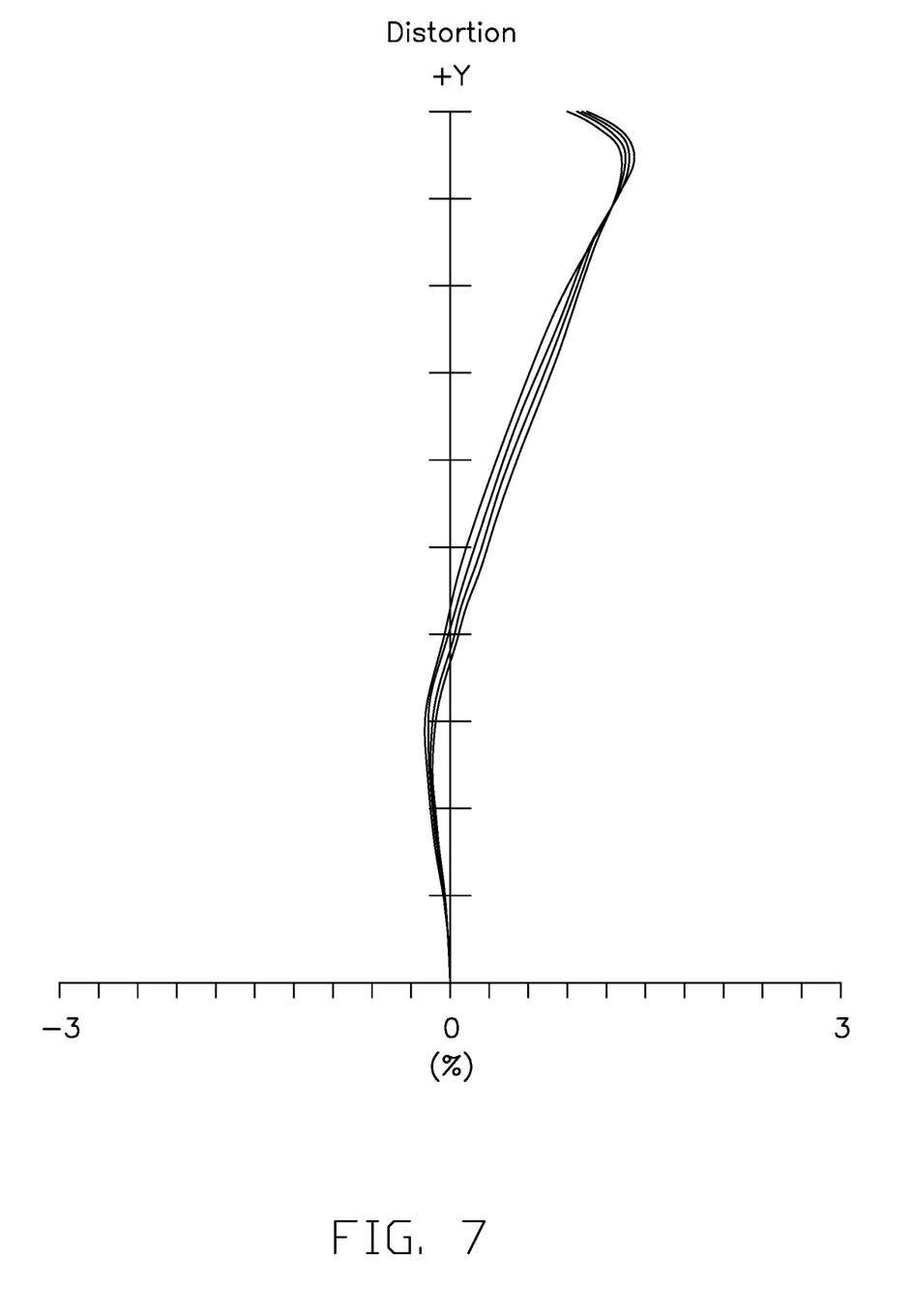
FIG. 7 is distortion characteristic curve diagram of the second embodiment of the camera lens.

Furthermore, the curve shown in FIG. 7 is the distortion characteristic curve of the camera lens 100. It can be seen from FIG. 7 that the optical distortion amount of the camera lens 100 is controlled within the range of −3.00% to 3.00%.

Figure 8:
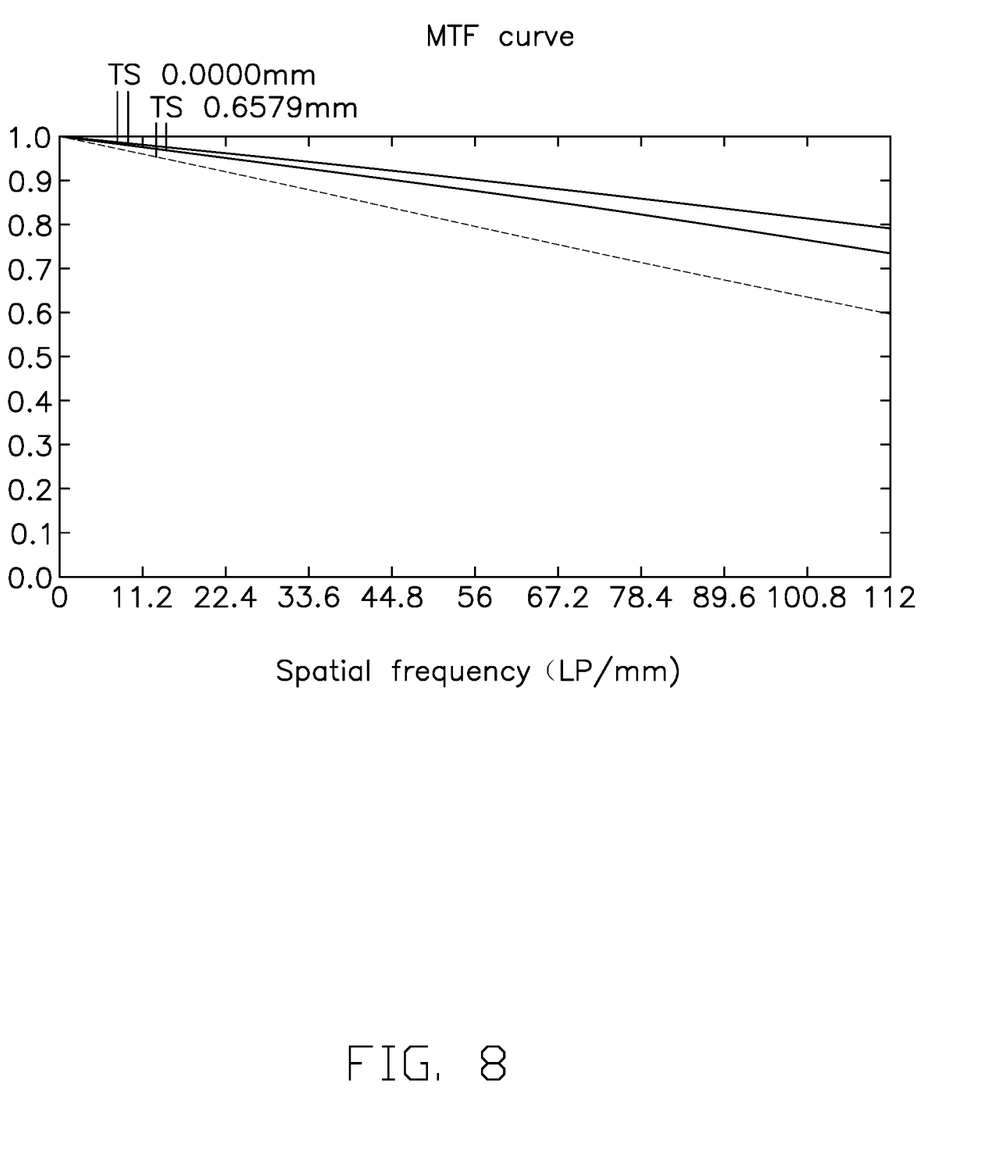
FIG. 8 is modulation transfer function characteristic curve diagram of the second embodiment of the camera lens.

FIG. 8 is a Modulation Transfer Function (MTF) diagram of the camera lens 100, using the same units as before.

Under the condition of ¼ frequency (Nyquist frequency), the ¼ frequency of this embodiment is 112 l p/mm, the MTF of the center field of view is >75%, as shown by the curve mc.

MTF of 0.8 field of view >55%, as shown by curve mp, and the MTF of the field of view between the central field of view and 0.8 field of view is between 55% and 75%.

The total length (TTL) of the camera lens 100 is only 1.38 mm, the camera lens meeting the conditions of formulas (5)-(8) has the characteristics of short overall length and higher resolution.

The camera lens 100 includes only three lenses. By specifying the ratio of the maximum imaging circle diameter to the distance from the center point of the object side surface of the first lens to the imaging surface, overall length of the camera lens is reduced. By specifying the respective refractive powers of the three lenses, aberrations can be corrected and the lens resolution can be improved, and, in achieving short overall length, a higher resolution is achieved.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A camera lens comprising:
a first lens having a positive power; wherein the first lens comprises a first surface and a second surface in sequence from object side to imaging side;
a second lens having a negative power; wherein the second lens comprises a third surface and a fourth surface in sequence from the object side to the imaging side;
a third lens having a positive power; wherein the third lens comprises a fifth surface and a sixth surface in sequence from the object side to the imaging side;
an imaging surface; wherein the first lens, the second lens, the third lens and the imaging surface are disposed in sequence from the object side to the imaging surface;
wherein the camera lens satisfies formulas:

$1.00 < D/TTL < 1.25;$ $0.85 < |F1|/|F| < 0.95;$ $3.85 < |F2|/|F| < 4.15;$ $21.50 < |F3|/|F| < 27.50;$ wherein D is the maximum imaging circle diameter of the imaging surface, TTL is distance from center point of surface of the object side of the first lens to the imaging surface, F is the total focal length of the camera lens, F1 is the focal length of the first lens, F2 is the focal length of the second lens, and F3 is the focal length of the third lens.

2. The camera lens according to claim 1, wherein the first surface, the second surface, the third surface, the fourth surface, the fifth surface, and the sixth surface are all aspherical.

3. The camera lens according to claim 2, wherein the first surface is convex relative to the object side, the second surface is convex relative to the imaging surface; the third surface is concave and groove-shaped relative to the object side, and the fourth surface is convex relative to the imaging surface, the fifth surface is convex relative to the object side, and the sixth surface is concave and groove-shaped relative to the imaging surface.

4. The camera lens according to claim 3, wherein the camera lens satisfies the formulas:

$5.50 < SF2 < 6.5;$ $10.50 < SF3 < 11.50;$ wherein $SFi = (C1i + C2i)/(C1i - C2i)$, and $i = 2,3;$ wherein $C1i$ is radius of curvature of surface of i-th lens on the object side, $C2i$ is the radius of curvature of the surface of the i-th lens on the imaging side.

5. The camera lens according to claim 4, wherein the camera lens satisfies the formula:

$1.00 < N2/N3 < 1.15;$ wherein N2 is refractive index of the second lens, and N3 is the refractive index of the third lens.

6. The camera lens according to claim 5, wherein the camera lens satisfies the formula:

$0.30 < V2/V3 < 0.40;$ wherein V2 is Abbe number of the second lens, and V3 is the Abbe number of the third lens.

7. The camera lens according to claim 6, wherein the camera lens satisfies the formula:

$1.55 < T12/ET12 < 1.75;$ wherein T12 is thickness of center interval between the first lens and the second lens, and ET12 is the thickness of edge interval between the first lens and the second lens.

8. The camera lens according to claim 7, wherein the camera lens satisfies the formula:

$0.55 < T23/ET23 < 0.75;$ wherein T23 is the thickness of the center interval between the second lens and the third lens, and ET23 is the thickness of the edge interval between the second lens and the third lens.

9. The camera lens according to claim 1, wherein the camera lens further comprises a diaphragm, and the diaphragm is disposed on the object side of the first lens.

10. The camera lens according to claim 1, wherein the camera lens further comprises a filter element, and the filter element is located between the third lens and the imaging surface.

11. A camera lens comprising:
a first lens having a positive power; wherein the first lens comprises a first surface and a second surface in sequence from object side to imaging side;
a second lens having a negative power; wherein the second lens comprises a third surface and a fourth surface in sequence from the object side to the imaging side;
a third lens having a positive power; wherein the third lens comprises a fifth surface and a sixth surface in sequence from the object side to the imaging side;
an imaging surface; wherein the first lens, the second lens, the third lens and the imaging surface are disposed in sequence from the object side to the imaging surface;

a diaphragm disposing on the object side of the first lens;

a filter element locating between the third lens and the imaging surface;

wherein the camera lens satisfies formulas:

$1.00 < D/TTL < 1.25;$ $0.85 < |F1|/|F| < 0.95;$ $3.85 < |F2|/|F| < 4.15;$ $21.50 < |F3|/|F| < 27.50;$ wherein D is the maximum imaging circle diameter of the imaging surface, TTL is distance from center point of surface of the object side of the first lens to the imaging surface, F is the total focal length of the camera lens, F1 is the focal length of the first lens, F2 is the focal length of the second lens, and F3 is the focal length of the third lens.

12. The camera lens according to claim 11, wherein the first surface, the second surface, the third surface, the fourth surface, the fifth surface, and the sixth surface are all aspherical.

13. The camera lens according to claim 12, wherein the first surface is convex relative to the object side, the second surface is convex relative to the imaging surface; the third surface is concave and groove-shaped relative to the object side, and the fourth surface is convex relative to the imaging surface, the fifth surface is convex relative to the object side, and the sixth surface is concave and groove-shaped relative to the imaging surface.

14. The camera lens according to claim 13, wherein the camera lens satisfies the formulas:

$5.50 < SF2 < 6.5;$ $10.50 < SF3 < 11.50;$ wherein $SFi = (C1i + C2i)/(C1i - C2i)$, and $i = 2, 3;$ wherein $C1i$ is radius of curvature of surface of i-th lens on the object side, $C2i$ is the radius of curvature of the surface of the i-th lens on the imaging side.

15. The camera lens according to claim 14, wherein the camera lens satisfies the formula:

$1.00 < N2/N3 < 1.15;$ wherein N2 is refractive index of the second lens, and N3 is the refractive index of the third lens.

16. The camera lens according to claim 15, wherein the camera lens satisfies the formula:

$0.30 < V2/V3 < 0.40;$ wherein V2 is Abbe number of the second lens, and V3 is the Abbe number of the third lens.

17. The camera lens according to claim 16, wherein the camera lens satisfies the formula:

$1.55 < T12/ET12 < 1.75;$ wherein T12 is thickness of center interval between the first lens and the second lens, and ET12 is the thickness of edge interval between the first lens and the second lens.

18. The camera lens according to claim 17, wherein the camera lens satisfies the formula:

$0.55 < T23/ET23 < 0.75;$ wherein T23 is the thickness of the center interval between the second lens and the third lens, and ET23 is the thickness of the edge interval between the second lens and the third lens.

* * * * *